(12) United States Patent
Fukumoto et al.

(10) Patent No.: US 6,633,326 B2
(45) Date of Patent: Oct. 14, 2003

(54) DEVICE FOR CAPTURING IMAGES THREE-DIMENSIONALLY

(75) Inventors: Shinpei Fukumoto, Hirakata (JP); Hiroshi Kano, Kyotanabe (JP); Hideto Fujita, Yao (JP); Hiroaki Yoshida, Takatsuki (JP)

(73) Assignee: Sanyo Electric Co., Ltd., Osaka (JP)

( * ) Notice: Subject to any disclaimer, the term of this patent is extended or adjusted under 35 U.S.C. 154(b) by 54 days.

(21) Appl. No.: 09/964,644

(22) Filed: Sep. 28, 2001

(65) Prior Publication Data

US 2002/0039134 A1 Apr. 4, 2002

(30) Foreign Application Priority Data

Sep. 29, 2000 (JP) ........................................ 2000-299376

(51) Int. Cl.$^7$ ................................................. H04N 9/47
(52) U.S. Cl. ........................................... 348/42; 348/61
(58) Field of Search ............................... 348/36, 37, 38, 348/39, 40, 42, 43, 44, 51, 61, 77, 150, 151

(56) References Cited

U.S. PATENT DOCUMENTS

| 4,027,329 | A | * | 5/1977 | Coutta ......................... 348/150 |
| 5,282,029 | A | | 1/1994 | Lawrence et al. |
| 5,406,327 | A | | 4/1995 | Guarnotta |
| 5,420,626 | A | * | 5/1995 | Lawrence et al. ............. 348/44 |

FOREIGN PATENT DOCUMENTS

| DE | 2208676 A1 | 8/1972 |
| FR | 2582437 A1 | 12/1986 |
| FR | 2633134 A1 | 12/1989 |
| FR | 2678796 A1 | 1/1993 |

OTHER PUBLICATIONS

European Search Report dated Apr. 3, 2003.

* cited by examiner

*Primary Examiner*—Chris Kelley
*Assistant Examiner*—Behrooz Senfi
(74) *Attorney, Agent, or Firm*—Rader, Fishman & Grauer PLLC

(57) ABSTRACT

The invention provides a device for capturing images three-dimensionally which comprises a rail 2 extending around a three-dimensional object images of which are to be captured, an image pickup head 3 movable along the rail 2, a signal cable 8 interconnecting a head terminal 81 on the head 3 and a signal relay terminal 82 on the rail 2, an auxiliary cable 83 interconnecting a head-side connecting point 85 on the head 3 and a rail-side connecting point 84 on the rail 2, and a connecting member 9 having the signal cable 8 and the auxiliary cable 83 slidably reeved therearound for turning back the cables in directions opposite to each other. The signal cable 8 extends from the head terminal 81 in one direction, is turned back on the connecting member 9 and extends to the signal relay terminal 82, while the auxiliary cable 83 extends from the head-side connecting point 85 in the opposite direction, is turned back on the connecting member 9 and extends to the rail-side connecting point 84.

5 Claims, 4 Drawing Sheets

DEVICE FOR CAPTURING IMAGES THREE-DIMENSIONALLY

FIELD OF THE INVENTION

The present invention relates to three-dimensional image capturing devices comprising an image pickup head which is movable along a path surrounding an object of three-dimensional shape for picking up images of the object three-dimensionally.

BACKGROUND OF THE INVENTION

The size of shoes is expressed generally in the length of the foot from the heel to the toe. The shape of the foot differs from person to person not only with respect to the length thereof but also in respect of the height and width of the instep, so that in making shoes which fit to a particular person, there is a need to measure the three-dimensional shapes of the feet of the person. It is conventional practice to measure some typical dimensions, such as the length of the foot, the height and width of the instep, with an instrument and prepare a last based on the measurements obtained. However, the conventional method is not only cumbersome and inefficient but also has the problem that the limited number of dimensions still fail to accurately express the three-dimensional shape of the foot.

Accordingly the present applicant developed an apparatus shown in FIG. 6 for measuring the three-dimensional shape of a foot A. The apparatus comprises a rail mechanism 20 in the form of a loop and installed on a base 1 for surrounding an object of measurement, i.e., the foot A, and an image pickup head 3 having a CCD camera incorporated therein and movable along the rail mechanism 20. With this apparatus, a pair of fixed cameras 6, 7 are arranged above the object of measurement, i.e., the foot A, for capturing images of the image pickup head 3 in movement, whereby the position of the head 3 on a fixed coordinate system is measured. The video signal from the CCD camera incorporated in the image pickup head 3 and the video signals from the fixed cameras 6, 7 are fed through signal cables 4, 40 to a control unit 5, which processes the signals as by coordinate conversion to measure the three-dimensional shape of the foot A.

FIG. 4 shows details of the construction of the rail mechanism 20 included in the three-dimensional shape measuring apparatus. The rail mechanism 20 comprises an inner loop wall 21 having the image pickup head 3 in engagement therewith, and an outer loop wall 22 surrounding the inner loop wall 21. A head terminal 42 provided on the head 3 and a signal relay terminal 43 provided on the outer loop wall 22 are interconnected by a signal cable 41. Electric power is supplied from the control unit 5 to the signal relay terminal 43 and further to the head terminal 42 on the image pickup head 3 through the signal cable 41. The video signal obtained from the terminal 42 of the head 3 is fed to the signal relay terminal 43 via the signal cable 41 and further to the control unit 3.

With the rail mechanism 20 shown in FIG. 4, the image pickup head 3 makes a complete circuit along the inner loop wall 21. The signal cable 41 is free to flex with this movement. For example, when the image pickup head 3 returns to the original position after making one circuit counterclockwise, the signal cable 41 assumes the shifted position indicated in a chain line. However, in the course of movement of the head 3 from the position shown in FIG. 4 toward the signal relay terminal 43, the signal cable 41 is bent by being pushed by the head 3 and is therefore likely to move partly slower than the head 3 as shown in FIG. 5. In this case, part of the signal cable 41 is likely to become caught by the head 3 by being brought to therebelow or to move over the outer loop wall 22 to outside.

SUMMARY OF THE INVENTION

Accordingly, an object of the present is provide a device for capturing images three-dimensionally which comprises an image pickup head and a signal cable extending from the image pickup head and which is free of the likelihood that the signal cable will become caught by the head or move out of a specified area during the movement of the head.

The present invention provides a device for capturing images three-dimensionally which comprises:

a rail 2 extending in the form of a loop around a three-dimensional object images of which are to be captured, an image pickup head 3 movable along the rail 2, a signal cable 8 interconnecting a head terminal 81 provided on the image pickup head 3 and a signal relay terminal 82 provided at a specified position relative to the rail 2, an auxiliary cable 83 interconnecting a head-side connecting point 85 provided on the image pickup head 3 and a rail-side connecting point 84 provided at specified position relative to the rail 2 and in the vicinity of the signal relay terminal 82, and a connecting member 9 movable along the rail 2 and having the signal cable 8 and the auxiliary cable 83 slidably reeved therearound for turning back the cables in directions opposite to each other.

The signal cable 8 is provided along a path extending from the head terminal 81 in one direction along the rail 2, turned back on the connecting member 9 and extending along the rail 2 to the signal relay terminal 82, while the auxiliary cable 83 is provided along a path extending from the head-side connecting point 85 in the other direction opposite to said one direction along the rail 2, turned back on the connecting member 9 and extending along the rail 2 to the rail-side connecting point 84. The signal cable 8 is used for supplying electric power from the signal relay terminal 82 to the image pickup head 3 and for feeding an output signal from the head 3 to the signal relay terminal 82. The auxiliary cable 83 is used for operatively connecting the image pickup head 3 to the connecting member 9.

In the case where the image pickup head 3 of the device of the invention moves along the rail 2 in one direction, e.g., in the direction in which the signal cable 8 extends, the auxiliary cable 83 is pulled along by the movement of the image pickup head 3, whereby the connecting member 9 is driven in the same direction as the image pickup head 3. This movement of the connecting member 9 pulls the signal cable 8 extending from the image pickup head 3 toward the direction of movement of the head 3. Accordingly, the signal cable 8 is not slackened by the movement of the image pickup head 3 but remains positioned along the path extending from the head terminal 81 to the signal relay terminal 82 via the connecting member 9.

Alternatively when the image pickup head 3 moves in the opposite direction, i.e. in the direction in which the auxiliary cable 83 extends, the signal cable 8 is pulled along by the movement of the head 3, whereby the connecting member 9 is driven in the same direction as the image pickup head 3. This movement of the connecting member 9 pulls the auxiliary cable 83 extending from the image pickup head 3 toward the direction of movement of the head 3. Accordingly, the auxiliary cable 83 is not slackened by the movement of the image pickup head 3 but remains positioned along the path extending from the head-side connecting point 85 to the rail-side connecting point 84 via the connecting member 9.

Stated specifically, the connecting member 9 has mounted thereon a signal cable post 92 for reeving the signal cable 8 therearound and turning back the cable 8, and an auxiliary cable post 91 for reeving the auxiliary cable 83 therearound and turning back the cable 83. This enables the signal cable 8 and the auxiliary cable 83 to change the course through 180 degrees while slidingly moving around the respective posts without interfering with each other.

Further stated specifically, the rail 2 comprises an inner loop wall 21 and an outer loop wall 22, and the image pickup head 3 is slidably in engagement with the inner loop wall 21 or the outer loop wall 22, the signal cable 8 and the auxiliary cable 83 being accommodated between the inner loop wall 21 and the outer loop wall 22, the signal relay terminal 82 and the rail-side connecting point 84 being provided on the inner loop wall 21. With this specific construction, the portions of the signal cable 8 and the auxiliary cable 83 in contact with the inner loop wall 21 are connected respectively to the signal relay terminal 82 and the rail-side connecting point 84 to remain immovable relative to the inner loop wall 21. This obviates the friction between the inner loop wall 21 and each of the two cables 8, 83, permitting the cables to shift smoothly with the movement of the image pickup head 3.

Thus, the device of the invention for capturing images three-dimensionally is free of the likelihood that the cable will become caught by the head or move out of the specified area.

DETAILED DESCRIPTION OF EMBODIMENT

Figure 1:
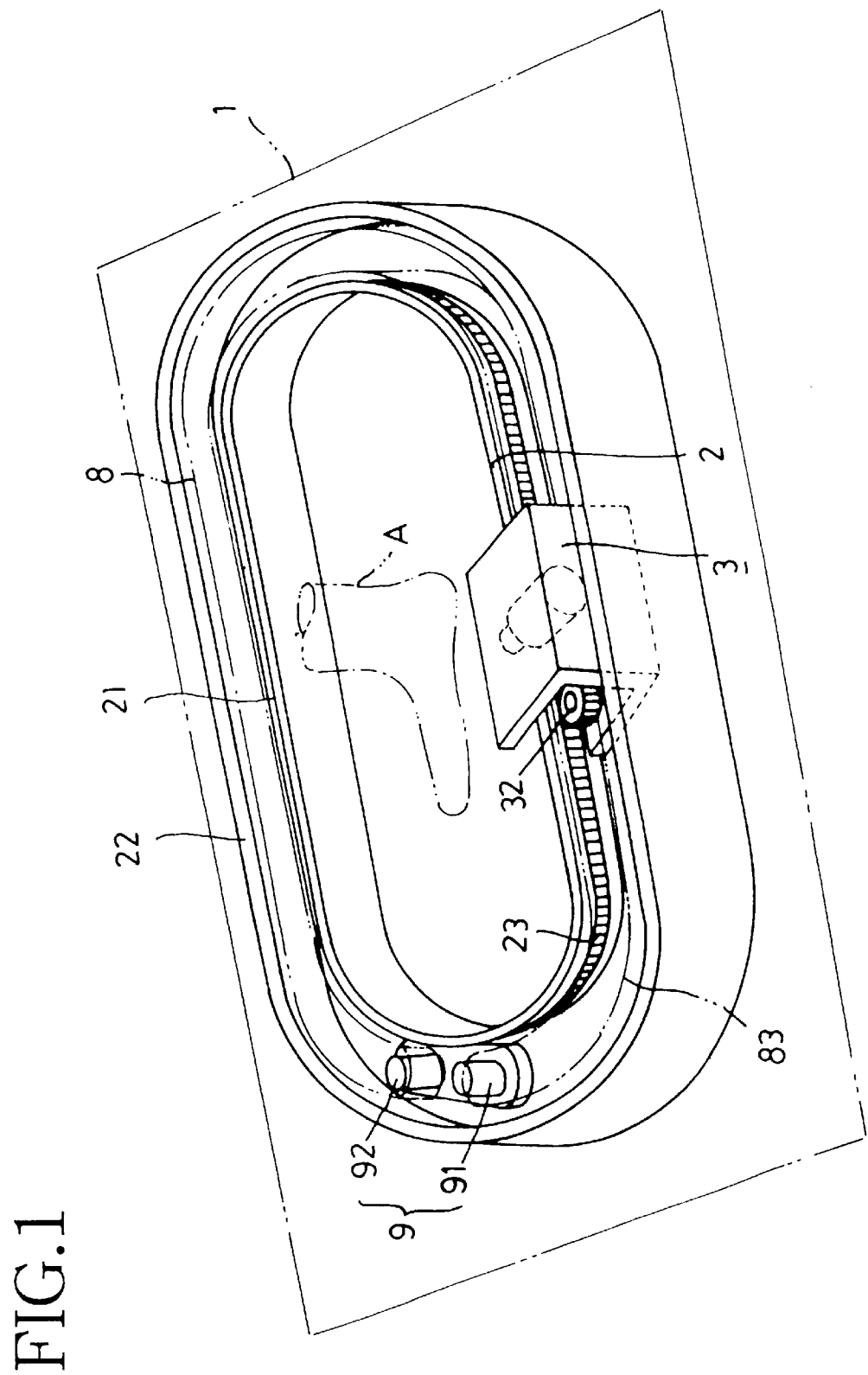
FIG. 1 is a perspective view of a device of the invention for capturing images three-dimensionally.

With reference to the drawings, a detailed description will be given below of the present invention as embodied into a device for capturing images three-dimensionally for use in three-dimensional shape measuring apparatus like the one shown in FIG. 6. As shown in FIG. 1, the device of the invention comprises an image pickup head 3 having a CCD camera 31 incorporated therein for capturing images of an object of measurement, i.e., a foot A, and a rail 2 extending in the form of an elliptical loop surrounding the foot A. The rail 2 comprises an inner loop wall 21 and an outer loop wall 22 which are formed on a base 1.

The inner loop wall 21 has a rack 23 provided on its inner periphery and extending over the entire length thereof, while the image pickup head 3 has a pinion 32 meshing with the rack 23. The pinion 32 is driven forward and reversely by a motor (not shown), whereby the head 3 is reciprocatingly moved along the rail 2. Disposed in an annular space formed between the inner loop wall 21 and the outer loop wall 22 is a connecting member 9 slidably mounted on the base 1 and provided with an auxiliary cable post 91 and a signal cable post 92.

Figure 2:
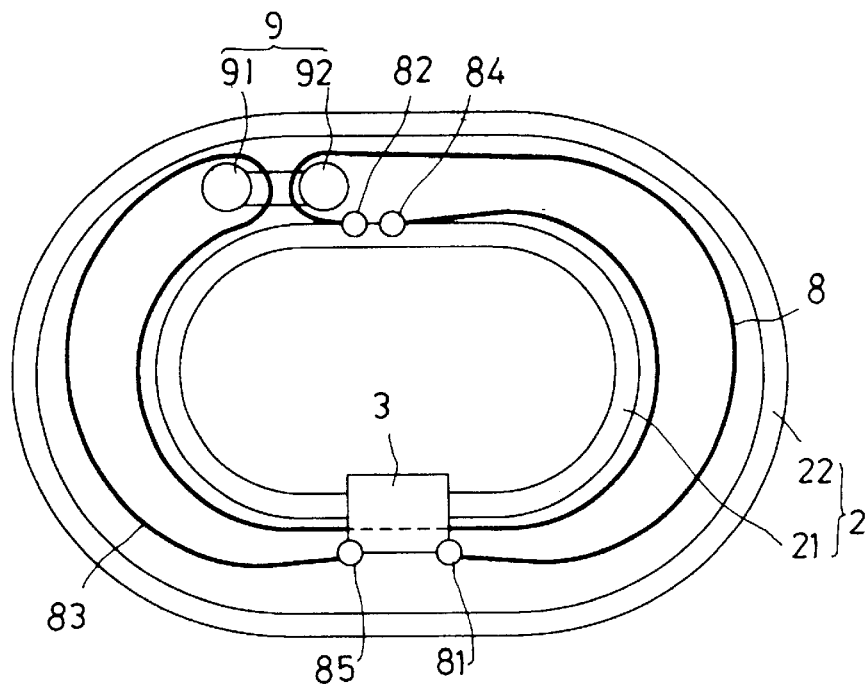
FIG. 2 is a plan view showing an image pickup head of the device before the head is moved.

With reference to FIG. 2, the image pickup head 3 is provided with a head terminal 81 and a head-side connecting point 85. A signal relay terminal 82 and a rail-side connecting point 84 which are positioned close to each other are provided on the outer periphery of the inner loop wall 21. A striplike signal cable 8 extends from the head terminal 81 of the image pickup head 3 in a counterclockwise direction along the inner periphery of the outer loop wall 22 while changing the course, and is reeved around the signal cable post 92 through 180 degrees, thereby turned back and thereafter attached to the signal relay terminal 82 on the inner loop wall 21.

On the other hand, a striplike auxiliary cable 83 extends from the head-side connecting point 85 on the image pickup head 3 in a clockwise direction along the inner periphery of the outer loop wall 22 while changing the course, is reeved around the auxiliary cable post 91 on the connecting member 9 through 180 degrees and thereby turned back, then extends along the outer periphery of the inner loop wall 22, further extends past the image pickup head 3 and is thereafter attached to the rail-side connecting point 84 on the inner loop wall 21.

The signal cable 8 comprises a plurality of power lines and signal lines for supplying electric power from the signal relay terminal 82 to the image pickup head 3 and for feeding an output signal from the head 3 to the signal relay terminal 82, while the auxiliary cable 83 is used for operatively connecting the image pickup head 3 to the connecting member 9 and has neither power lines nor signal line.

Figure 6:
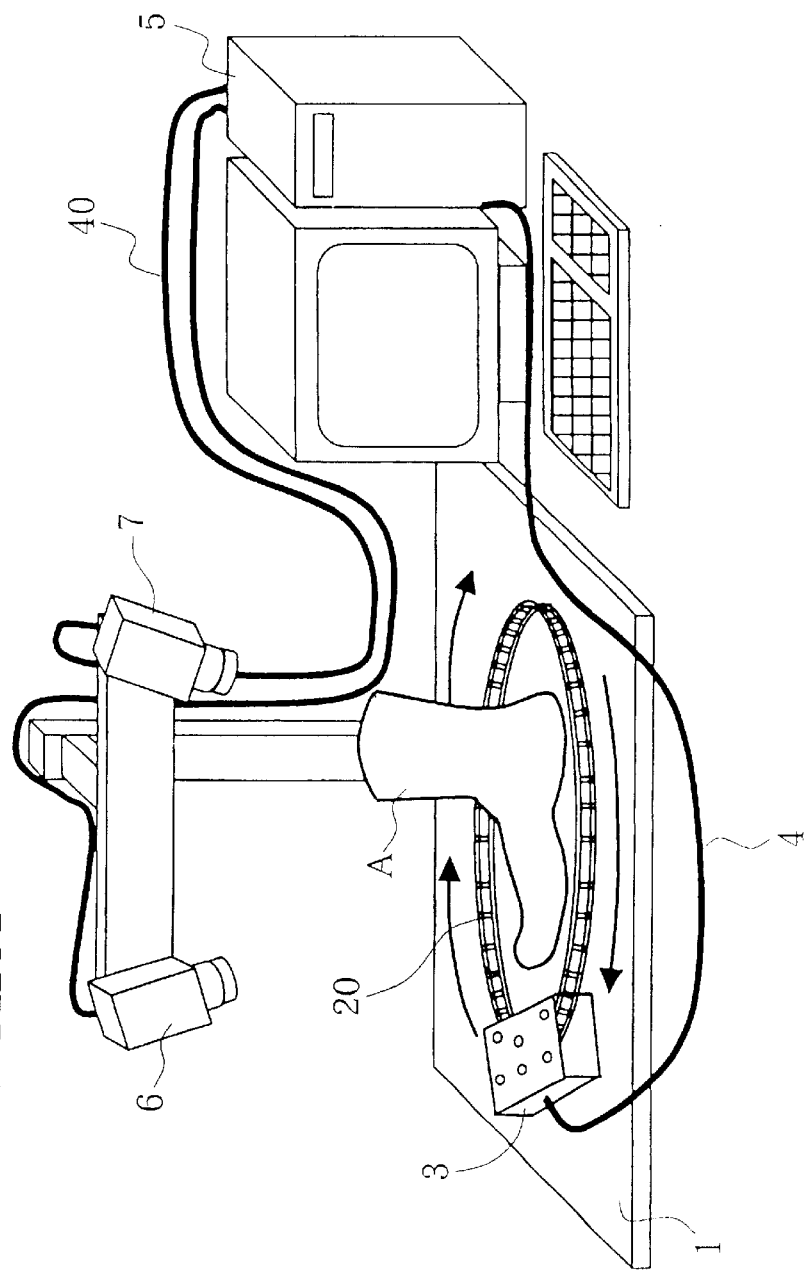
FIG. 6 is a perspective view showing the entire construction of the conventional apparatus.

The output signal of the image pickup head 3 is fed from the signal relay terminal 82 on the inner loop wall 21 to the control unit 5 shown in FIG. 6 via an unillustrated signal cable, and the three-dimensional contour of the object of measurement thus prepared is presented on a display.

Figure 3:
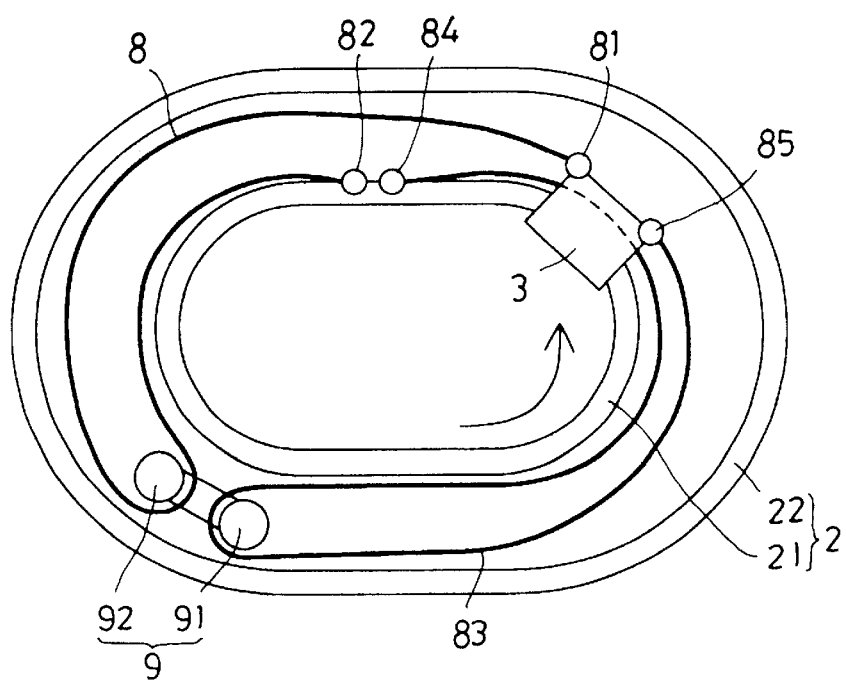
FIG. 3 is a plan view showing the image pickup head of the device in movement.
Figure 4:
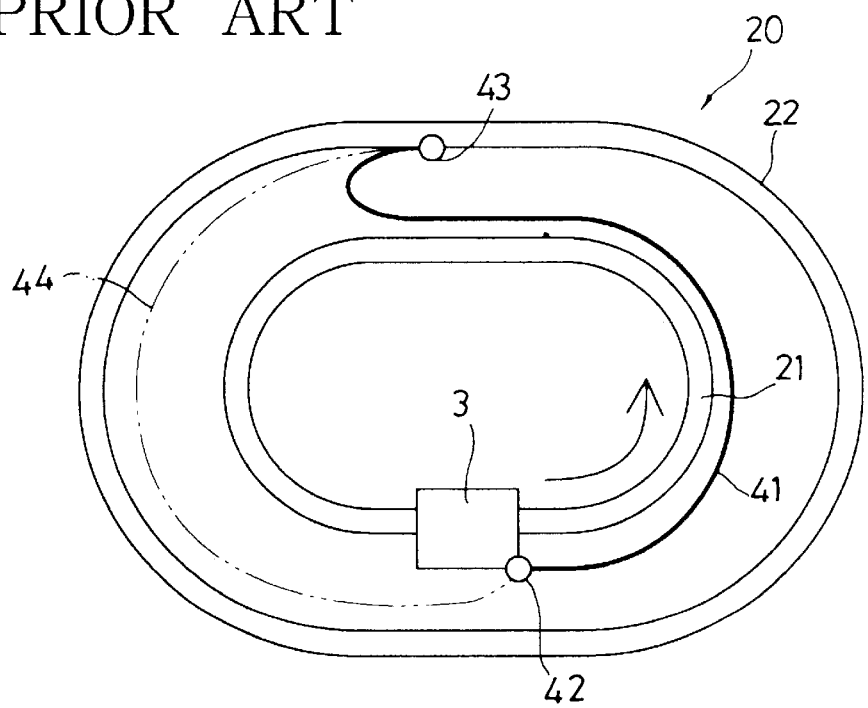
FIG. 4 is a plan view showing an image pickup head of a conventional three-dimensional shape measuring apparatus before the head is moved.
Figure 5:
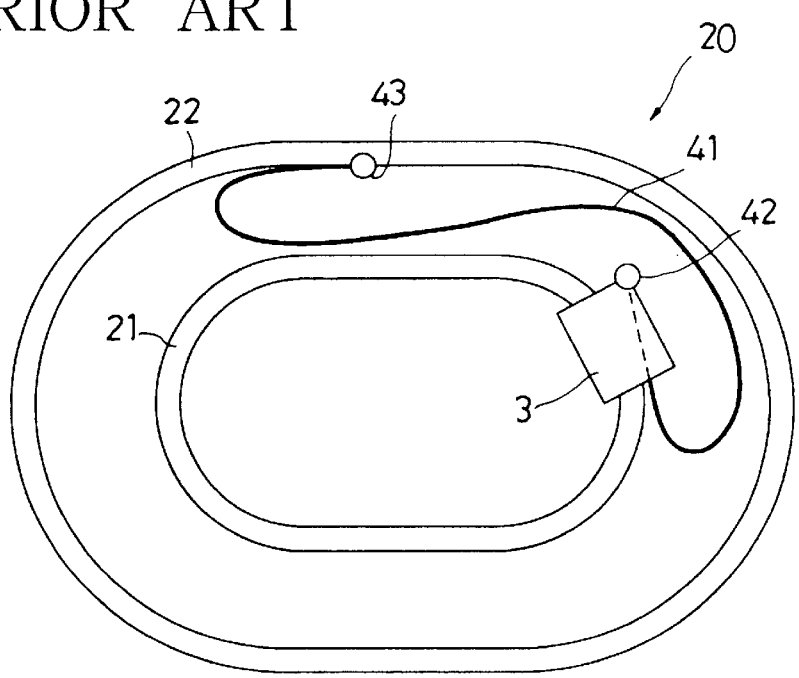
FIG. 5 is a plan view showing the image pickup head of the conventional apparatus in movement.

When the image pickup head 3 of the device described is driven, for example, counterclockwise as shown in FIG. 3, the auxiliary cable 83 is pulled along by the movement of the image pickup head 3, whereby the connecting member 9 is driven in the same direction as the image pickup head 3. The signal cable 8 extending from the image pickup head 3 is pulled along by this movement of the connecting member 9. Accordingly, the signal cable 8 and the auxiliary cable 83 are not slackened by the movement of the image pickup head 3, but the signal cable 8 remains positioned along the path extending from the head terminal 81 to the signal relay terminal 82 via the signal cable post 92 on the connecting member 9, with the auxiliary cable 83 remaining positioned along the path which extends from the head-side connecting point 85 to the rail-side connecting point 84 by way of the auxiliary cable post 91 on the connecting member 9 and via the image pickup head 3.

When the image pickup head 3 is driven in the opposite direction, i.e. in the direction in which the auxiliary cable 83 extends, the signal cable 8 is pulled along by the movement of the head 3, whereby the connecting member 9 is driven in the same direction as the image pickup head 3. The auxiliary cable 83 extending from the image pickup head 3 is pulled along by this movement of the connecting member 9. Accordingly, the auxiliary cable 83 and the signal cable 8 are not slackened by the movement of the image pickup head 3, but the auxiliary cable 83 remains positioned along the path extending from the head-side connecting point 85 to the rail-side connecting point 84 via the auxiliary cable post 91 on the connecting member 9, while the signal cable 8 remains positioned along the path extending from the head terminal 81 to the signal relay terminal 82 via the signal cable post 92 on the connecting member 9.

Furthermore, the portions of the signal cable 8 and the auxiliary cable 83 in contact with the inner loop wall 21 are connected respectively to the signal relay terminal 82 and the rail-side connecting point 84 to remain immovable relative to the inner loop wall 21. This obviates the friction between the inner loop wall 21 and each of the two cables 8, 83, permitting the cables to shift smoothly with the movement of the image pickup head 3.

As descried above, the device of the invention for capturing images three-dimensionally is free of the likelihood that the signal cable 8 and the auxiliary cable 83 will become caught by the image pickup head 3 or move over the inner loop wall 21 to outside. The image pickup head 3 is therefore smoothly movable at all times.

The device of the present invention is not limited to the foregoing embodiment in construction but can be modified variously by one skilled in art without departing from the spirit of the invention as set forth in the appended claims. For example, the signal cable 8 only is used for supplying electric power and transmitting the signal, whereas both the signal cable 8 and the auxiliary cable 83 are usable for power supply and signal transmission. The connecting member 9 is not limited to one slidable on the base 1 but may be a member merely connecting the signal cable 8 to the auxiliary cable 83 and made movable while being held out of contact with the base 1 and the loop walls 21, 22. The rail 1 is not limited to the one shown in FIG. 1 but can be, for example, such that the inner loop wall 21 alone is provided on the base 1, with the outer loop wall omitted.

Furthermore, the image pickup head 3 need not always be provided on the inner loop wall 21 of the rail 2 in engagement therewith but can be provided in engagement with the outer loop wall 22 of the rail 2.

What is claimed is:

1. A device which captures three-dimensional object images, the device for capturing images three-dimensionally comprising:

a rail (2) extending in the form of a loop around the three-dimensional object images of which are to be captured, an image pickup head (3) movable along the rail (2), a signal cable (8) interconnecting a head terminal (81) provided on the image pickup head (3) and a signal relay terminal (82) provided at a specified position relative to the rail (2), an auxiliary cable (83) interconnecting a head-side connecting point (85) provided on the image pickup head (3) and a rail-side connecting point (84) provided at specified position relative to the rail (2) and in the vicinity of the signal relay terminal (82), and a connecting member (9) movable along the rail (2) and having the signal cable (8) and the auxiliary cable (83) slidably reeved therearound for turning back the cables in directions opposite to each other, the signal cable (8) being provided along a path extending from the head terminal (81) in one direction along the rail (2), turned back on the connecting member (9) and extending along the rail (2) to the signal relay terminal (82), while the auxiliary cable (83) is provided along a path extending from the head-side connecting point (85) in the other direction opposite to said one direction along the rail (2), turned back on the connecting member (9) and extending along the rail (2) to the rail-side connecting point (84).

2. A device for capturing images three-dimensionally according to claim 1 wherein the connecting member (9) has mounted thereon a signal cable post (92) for reeving the signal cable (8) therearound and turning back the cable (8), and an auxiliary cable post (91) for reeving the auxiliary cable (83) therearound and turning back the cable (83).

3. A device for capturing images three-dimensionally according to claim 1 wherein the signal cable (8) is used for supplying electric power from the signal relay terminal (82) to the image pickup head (3) and for feeding an output signal from the head (3) to the signal relay terminal (82) and the auxiliary cable (83) is used for operatively connecting the image pickup head (3) to the connecting member (9).

4. A device for capturing images three-dimensionally according to claim 1 wherein the rail (2) comprises an inner loop wall (21) having the image pickup head (3) slidably in engagement therewith and an outer loop wall (22) formed externally of the inner loop wall (21), the signal cable (8) and the auxiliary cable (83) being accommodated between the inner loop wall (21) and the outer loop wall (22), the signal relay terminal (82) and the rail-side connecting point (84) being provided on the inner loop wall (21).

5. A device for capturing images three-dimensionally according to claim 1 wherein the rail (2) comprises an outer loop wall (22) having the image pickup head (3) slidably in engagement therewith and an inner loop wall (21) formed internally of the outer loop wall (22), the signal cable (8) and the auxiliary cable (83) being accommodated between the inner loop wall (21) and the outer loop wall (22), the signal relay terminal (82) and the rail-side connecting point (84) being provided on the inner loop wall (21).

* * * * *